US007281050B2

(12) United States Patent
Dinker et al.

(10) Patent No.: US 7,281,050 B2
(45) Date of Patent: Oct. 9, 2007

(54) DISTRIBUTED TOKEN MANAGER WITH TRANSACTIONAL PROPERTIES

(75) Inventors: Darpan Dinker, Santa Clara, CA (US); Pramod Gopinath, Union City, CA (US); Suveen R. Nadipalli, Sunnyvale, CA (US); Sudhir Tonse, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 889 days.

(21) Appl. No.: 10/408,885

(22) Filed: Apr. 8, 2003

(65) Prior Publication Data

US 2004/0215772 A1  Oct. 28, 2004

(51) Int. Cl.
*G06F 15/13* (2006.01)

(52) U.S. Cl. .......................... 709/229; 707/8; 707/203; 707/205

(58) Field of Classification Search ................ 709/229; 707/8, 203, 205
See application file for complete search history.

(56) References Cited

U.S. PATENT DOCUMENTS

| | | | |
|---|---|---|---|
| 5,123,104 A * | 6/1992 | Levine et al. ................... 707/1 |
| 5,454,108 A | 9/1995 | Devarakonda et al. |
| 5,634,122 A | 5/1997 | Loucks et al. |
| 5,666,486 A | 9/1997 | Alfieri et al. |
| 5,684,807 A | 11/1997 | Bianchini et al. |
| 5,812,780 A | 9/1998 | Chen et al. |
| 5,852,747 A | 12/1998 | Bennett et al. |
| 5,913,213 A | 6/1999 | Wikstrom et al. |
| 5,951,694 A | 9/1999 | Choquier et al. |
| 6,002,868 A | 12/1999 | Jenkins et al. |
| 6,006,259 A | 12/1999 | Adelman et al. |
| 6,032,216 A | 2/2000 | Schmuck et al. |
| 6,067,559 A | 5/2000 | Allard et al. |
| 6,097,380 A | 8/2000 | Crites et al. |
| 6,108,699 A | 8/2000 | Moiin |
| 6,167,490 A | 12/2000 | Levy et al. |
| 6,175,931 B1 | 1/2001 | Hornung |
| 6,192,401 B1 | 2/2001 | Modiri et al. |
| 6,249,879 B1 | 6/2001 | Walker et al. |
| 6,324,492 B1 | 11/2001 | Rowe |
| 6,330,689 B1 | 12/2001 | Jin et al. |
| 6,353,836 B1 * | 3/2002 | Bamford et al. ............ 707/203 |
| 6,438,548 B1 * | 8/2002 | Grim et al. .................... 707/8 |
| 6,477,172 B1 | 11/2002 | Burger et al. |
| 6,480,473 B1 | 11/2002 | Chambers et al. |
| 6,512,740 B1 | 1/2003 | Baniewicz et al. |

(Continued)

OTHER PUBLICATIONS

"Concurrency Service Specification," Published Apr. 2000, Object Management Group.
Devarakonda, Murthy et al., "Recovery in the Calypso Filesystem," ACM Transactions on Computer Systems, vol. 14, No. 3, Aug. 1996, pp. 287-310.

*Primary Examiner*—Jinsong Hu
(74) *Attorney, Agent, or Firm*—Robert C. Kowert; Meyertons, Hood, Kivlin, Kowert & Goetzel, P.c.

(57) ABSTRACT

A system and method for controlling access to data in a distributed computer system. Distributed Token Manager (DTM) is a system-level service that coordinates read/write access of data objects (tokens) in a multi-process and multi-threaded environment. The DTM may support a transactional model such that write operations to a data object performed by a client process or thread can be either committed or rolled back.

29 Claims, 11 Drawing Sheets

U.S. PATENT DOCUMENTS

| | | |
|---|---|---|
| 6,522,995 B1 | 2/2003 | Conti et al. |
| 6,532,494 B1 | 3/2003 | Frank et al. |
| 6,567,808 B1 | 5/2003 | Eschelbeck et al. |
| 6,574,197 B1 | 6/2003 | Kanamaru et al. |
| 6,591,295 B1 | 7/2003 | Diamond et al. |
| 6,718,394 B2 | 4/2004 | Cain et al. |
| 6,748,429 B1 | 6/2004 | Talluri et al. |
| 6,748,554 B2 | 6/2004 | Jin et al. |
| 6,801,937 B1 | 10/2004 | Novaes et al. |
| 6,816,905 B1 | 11/2004 | Sheets et al. |
| 6,820,210 B1 | 11/2004 | Daruwalla et al. |
| 6,847,993 B1 | 1/2005 | Novaes et al. |
| 6,895,401 B2 | 5/2005 | Skinner et al. |
| 6,920,474 B2 | 7/2005 | Walsh et al. |
| 6,925,515 B2 * | 8/2005 | Burns et al. ............ 710/200 |
| 6,928,378 B2 | 8/2005 | Lebee et al. |
| 6,944,788 B2 | 9/2005 | Dinker et al. |
| 6,952,736 B1 * | 10/2005 | Westbrook ............ 709/229 |
| 6,961,769 B2 | 11/2005 | Arora et al. |
| 6,973,455 B1 * | 12/2005 | Vahalia et al. ............ 707/8 |
| 7,010,554 B2 * | 3/2006 | Jiang et al. ............ 707/205 |
| 2001/0010053 A1 | 7/2001 | Ben-Shacher et al. |
| 2001/0014097 A1 | 8/2001 | Beck et al. |
| 2001/0027453 A1 | 10/2001 | Suto |
| 2001/0040895 A1 | 11/2001 | Templin |
| 2002/0042693 A1 | 4/2002 | Kamp et al. |
| 2002/0062372 A1 | 5/2002 | Hong et al. |
| 2002/0073080 A1 | 6/2002 | Lipkin |
| 2002/0091750 A1 | 7/2002 | Kasaravalli et al. |
| 2002/0143958 A1 | 10/2002 | Montero et al. |
| 2002/0152307 A1 | 10/2002 | Doyle et al. |
| 2003/0110445 A1 | 6/2003 | Khaleque |
| 2003/0131041 A1 | 7/2003 | Dinker et al. |
| 2003/0154202 A1 | 8/2003 | Dinker et al. |
| 2003/0204509 A1 | 10/2003 | Dinker et al. |
| 2003/0204623 A1 | 10/2003 | Cain |
| 2003/0204786 A1 | 10/2003 | Dinker et al. |
| 2004/0044672 A1 | 3/2004 | Spencer |
| 2004/0059805 A1 | 3/2004 | Dinker et al. |
| 2004/0066741 A1 | 4/2004 | Dinker et al. |
| 2004/0098490 A1 | 5/2004 | Dinker et al. |
| 2004/0103098 A1 | 5/2004 | Mitra |
| 2004/0162885 A1 | 8/2004 | Garg et al. |
| 2004/0199815 A1 | 10/2004 | Dinker et al. |

* cited by examiner

DISTRIBUTED TOKEN MANAGER WITH TRANSACTIONAL PROPERTIES

BACKGROUND OF THE INVENTION

1. Field of the Invention

The present invention relates to the field of distributed software applications, and more particularly to a system and method for coordinating access to data in a distributed computer system.

2. Description of the Related Art

In the software arts, the problem of coordinating multiple threads or processes to share data or resources often arises. For example, when one process or thread is writing to data, other processes or threads may need to be prevented from writing to the same data at the same time in order to prevent data errors from occurring. Also, processes or threads may need to be prevented from reading from the data while it is being written to, in order to ensure that partial or incorrect data is not read.

Another aspect of coordinating the execution of multiple threads or processes pertains to forcing a series of operations to be performed atomically. For example, consider an application where one process updates a static data structure containing X and Y coordinates for items to be displayed by another process. If the update process alters the X coordinate for an item and is preempted before it can change the Y coordinate, the display process attempt to display the item before the Y coordinate is updated, resulting in the item being displayed at the wrong location.

Various types of "synchronization objects" have been used in synchronizing execution among multiple threads. For example, one type of synchronization object is a mutex. A mutex (short for mutual exclusion) may be used to guarantee exclusive access to shared data or a shared resource, typically by controlling access to the data or resource through "lock" and "unlock" operations. For example, a first thread may lock (acquire) a mutex indicating that the corresponding data or resource is in use before performing an update. The first thread may then unlock (release) the mutex after the data or resource has been updated. Any other threads must wait for the mutex to be unlocked before updating the data or resource. This technique of waiting for a mutex is often called "blocking" on a mutex because the thread is blocked and cannot continue until the mutex is released. Other types of synchronization objects known in the prior art include semaphores and queues.

Programmers often find it difficult to properly implement execution synchronization using synchronization objects. One reason for this is that the programmer is typically responsible for coding and managing execution synchronization at a relatively low level. This responsibility may include: properly releasing synchronization objects; defining and implementing timeout behavior when waiting to acquire a synchronization object; etc. In a complex application, this can require a significant amount of detailed work on the part of the programmer and can be difficult to accomplish.

Thus, execution synchronization can be difficult to implement correctly and serious problems can arise when not implemented correctly. Therefore, an improved system and method for synchronizing execution of software activities is desired. It would be desirable for the improved system and method to simplify the task of implementing execution synchronization for an application. In particular, it would be desirable to abstract this task so that the programmer can work at a more intuitive level, e.g., using an application programming interface (API) to perform the synchronization.

In addition, various systems may not provide a solution for coordinating access to distributed data in a highly distributed environment with multiple processes and threads accessing the distributed data. For example, consider the problem of a distributed application implemented over a cluster of application servers, such as a large-scale web application. It would be desirable to provide a system and method for coordinating access to distributed data for such an application.

SUMMARY

A system and method for coordinating access to data in a distributed computer system is provided. A Distributed Token Manager (DTM) service may manage a collection of "tokens" (also referred to herein as "data objects") for which access may be controlled using access rights. As used herein, the term "token" or "data object" may refer to a portion of data stored in memory of a computer system. Each token or data object may comprise data of any kind and may be structured or formatted in any of various ways.

One example of a token is HTTP session data or a portion of HTTP session data. Another example of a token is IIOP session data. Another example of a token is a component or object having callable methods or functions, such as a JavaBean, a Component Object Model (COM) object, a Common Object Request Broker Architecture (CORBA) object, etc.

In a distributed system, the tokens may be stored in memory of any computer of the system. For example, with respect to a distributed system comprising a cluster of application server computers, the tokens may be stored on one of the application servers, on a web server coupled to the application servers, in a database coupled to the application servers, in a backend system coupled to the application servers, etc. The tokens may be stored on the same or on different computers. Also, the tokens may vary in kind. For example, some tokens may represent HTTP session data for various end users, whereas other tokens may be executable components or objects.

A thread or process may be required to interface with the DTM service to acquire access rights before accessing a token. The thread or process may be required to acquire access rights for each token it needs to access. Thus, if the thread or process needs to access Token A as well as Token B, the thread or process may need to acquire access rights for each respective token. In one embodiment, there may be different types of access rights corresponding to different types of access to the tokens. For example, for read access of a token, the thread or process may need read access rights, whereas for write access of a token, the thread or process may need write access rights.

In one embodiment, the DTM service may utilize a transactional model. The DTM may be operable to commit or roll back write operations performed by a client. Rolling back the write operations may have the effect of un-doing whatever changes the write operations caused to a token or data object.

BRIEF DESCRIPTION OF THE DRAWINGS

A better understanding of the present invention can be obtained when the following detailed description of the preferred embodiment is considered in conjunction with the following drawings, in which.

Figure 1:
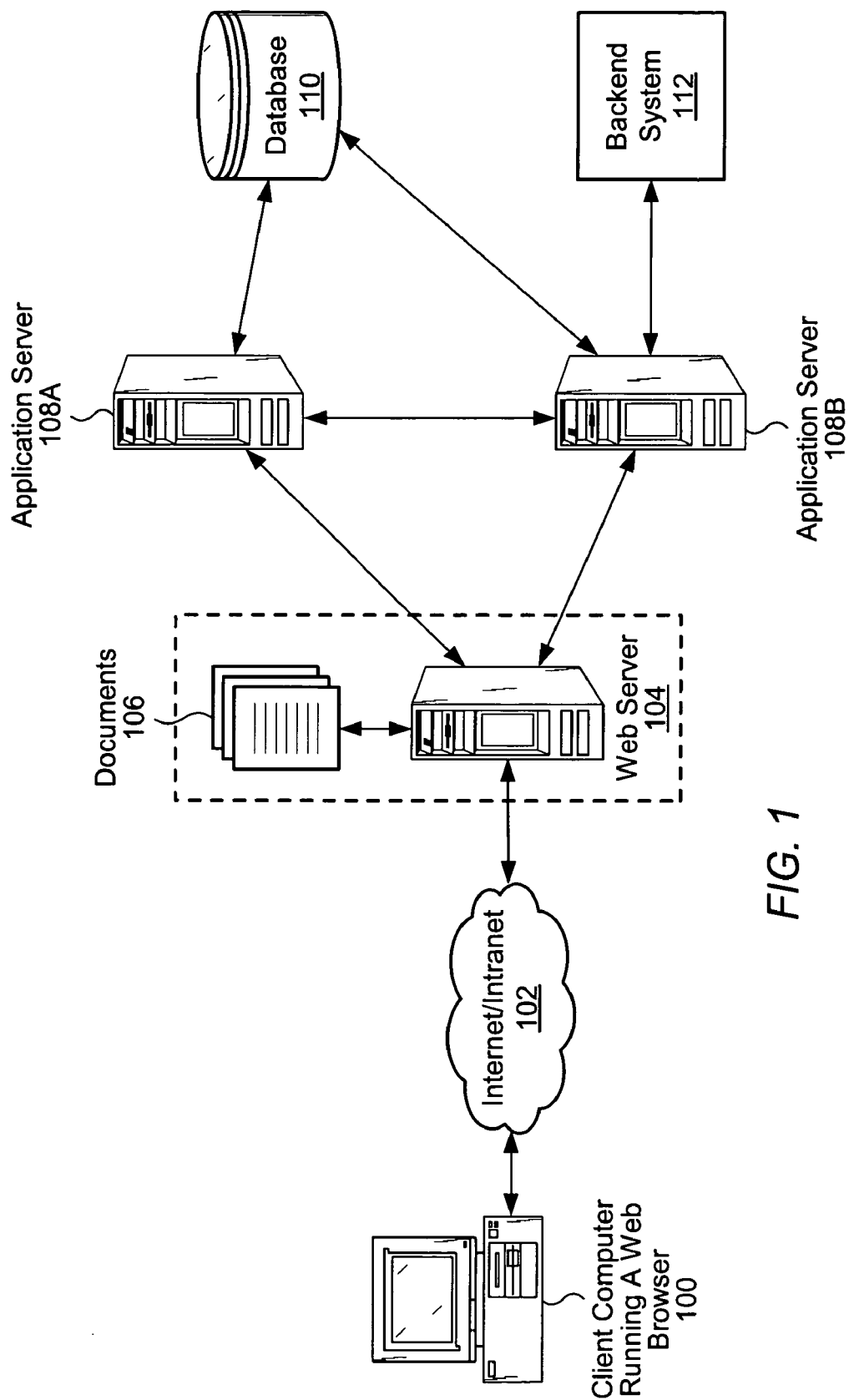
FIG. 1 illustrates an exemplary architecture for a web application for which it is necessary to coordinate data access, wherein the data is used by multiple processes distributed over multiple computers.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1—Web Application Architecture

FIG. 1 illustrates an exemplary architecture for a web application for which it may be necessary to coordinate data access as described herein, wherein the data is used by multiple processes distributed over multiple computers. It is noted that the system and method described herein may be utilized to coordinate access to data for any of various other types of distributed applications, and FIG. 1 simply illustrates one particular application.

In general, a web application may be defined as an Internet or Intranet-based application comprising a collection of resources that are accessible through uniform resource locators (URLs). The resources may include web pages comprising HTML, XML, scripting code such as Javascript or VBScript, or other types of elements. The resources may also include any of various types of executable programs or components, such as CGI programs, Java servlets, JavaBeans components, CORBA components, downloadable code such as Java classes or ActiveX components, etc. The resources may also include any other type of resource addressable through a URL.

FIG. 1 illustrates a client computer 100 running a web browser, such as the Netscape Navigator or Microsoft Internet Explorer web browsers. It is noted that the web browser need not be a web browser per se, but may be any of various types of client-side applications that include web-browsing functionality. For example, Microsoft Corp. provides programming interfaces enabling applications to incorporate various web-browsing capabilities provided by the Microsoft Internet Explorer code base.

The web browser may run in any type of client computer 100. For example, the web browser may run in a desktop computer or workstation running any of various operating systems, such as Windows, Mac OS, Unix, etc., or the web browser may run in a portable computing device, such as a personal data assistant, smart cellular phone, etc. The client computer 100 may use a network connection for communicating with a web server 104 via a network 102, such as the Internet or an Intranet. The client network connection may be a connection of any type, such as a PPP or SLIP dialup link, an Ethernet or token ring connection, an ISDN connection, a cable modem connection, any of various types of wireless connections, etc. Although web applications are often associated with particular communication protocols, such as HTTP or SSL, it is noted that any communication protocol, including TCP-based protocols and UDP-based protocols, may be used to communicate over the network 102.

As the web server 104 receives a request from a client computer 100, the web server may treat the request differently, depending on the type of resource the request references. For example, if the request references a document 106, such as an HTML document, then the web server may process the request itself, e.g., by retrieving the document from the web server's local file system or from a local cache and returning the document to the client computer. For other types of requests, e.g., requests referencing executable components, such as Java servlets, JavaBeans components, C program modules, CORBA components, etc., the web server may broker the request to an application server 108. For example, as shown in FIG. 1, there may be a plurality of application servers 108, and the web server may select an application server to which to broker the request, e.g., using load balancing techniques. The web server 104 may interface with an application server 108 using various techniques, e.g., through an in-process extension, such as an ISAPI or NSAPI extension.

The application server 108 may be configured as a part of an application server cluster. Although FIG. 1 illustrates an application server cluster with only two application servers, it is noted that the cluster may comprise any number of application servers. Each application server may interface with various types of other servers or systems. For example, as illustrated in FIG. 1, the application servers may communicate with a database 110. Each application server in the cluster may interface with the same systems, or the application servers may differ in which systems they interface with. For example, application server 108B is shown to interface with a backend system 112, e.g., a CICS, R/3, PeopleSoft, or other type of backend system. For example, the backend system 112 may be responsible for managing enterprise data or performing business functions for an enterprise.

Application servers in a cluster may or may not be in close physical proximity to each other. The application server computers may be connected to each other in any of various ways. For example, in one embodiment, each application server computer may be a member of a single local area network (LAN). In another embodiment, various of the application server computers may be located in two or more LANs, wherein the LANs are networked together.

In alternative embodiments, a client computer may communicate directly with an application server or application server cluster, without interfacing through a web server. As one example, the application servers may run an enterprise resource planning application, and the client computer 114 may be a computer within the enterprise that is connected to the application servers 108 via a WAN. In this example, the client computer may run "thick client" software, e.g., client software that comprises a portion of the enterprise resource planning application logic. The client computer software may interface directly with executable programs or components running on the application servers, e.g., through a protocol such as the Internet Inter-Orb Protocol (IIOP).

As noted above, FIG. 1 represents an exemplary architecture only, and many variations are possible. As a small handful of examples of alternative embodiments, multiple web servers may be present to receive requests from client computers and broker the requests to application servers, the web server may itself interface directly with a database, application servers may interface with various other types of systems, such as specialized authentication servers, e-commerce servers, other types of legacy systems, etc.

In a distributed application such as shown in FIG. 1, multiple threads or processes may access the same data. The multiple threads or processes may execute on the same and/or on different computer systems. For example, two processes which execute respectively on application server 108A and 108B may each access the same data. This data may be stored in any of various locations, such as on one of the application servers 108A or 108B, in the database 110, in the backend system 112, on the web server 104, etc. As described below, access to the data may be coordinated among the multiple threads or processes by associating access rights with the data. To access the data, a thread or process may be required to first acquire the appropriate access rights.

One example of a type of data for which access may be controlled in this manner is HTTP session data. As well known in the art, such session data may be used to track end users of a web application, i.e., users of client computers such as the client computer 100 illustrated in FIG. 1. Consider a case in which an end user submits a first request requiring the session data to be changed. The first request may be directed to the application server 108A. If the end user then submits a second request requiring the session data to be changed, the request may be load-balanced such that the second request may be directed to the application server 108B. If the two requests are received or processed closely together in time, the result may be that a first process on application server 108A and a second process on application server 108B attempt to write changes to the session data simultaneously, causing the session data to be corrupted. However, this problem may be avoided if each process is required to first acquire access rights to the session data before the process can access the session data.

Access for any of various other types of data may also be controlled in this manner. One example is IIOP session data. Another example is a stateful component or object, such as an Enterprise JavaBean. For example, a process may be required to acquire access rights before invoking methods or functions (or before invoking certain of the methods or functions) of the component or object.

Figure 2A:
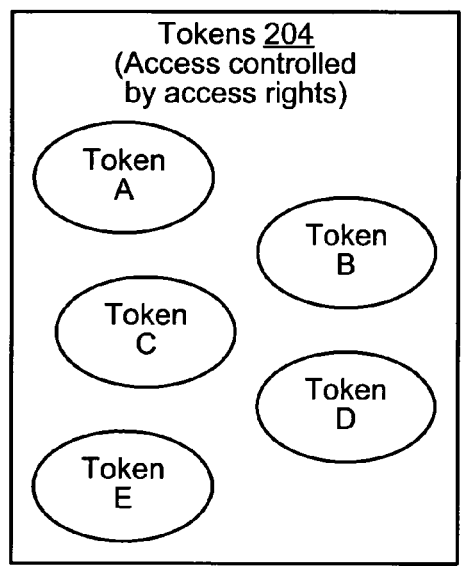
FIGS. 2A and 2B illustrate a plurality of "tokens" for which access may be controlled by access rights.
Figure 2B:
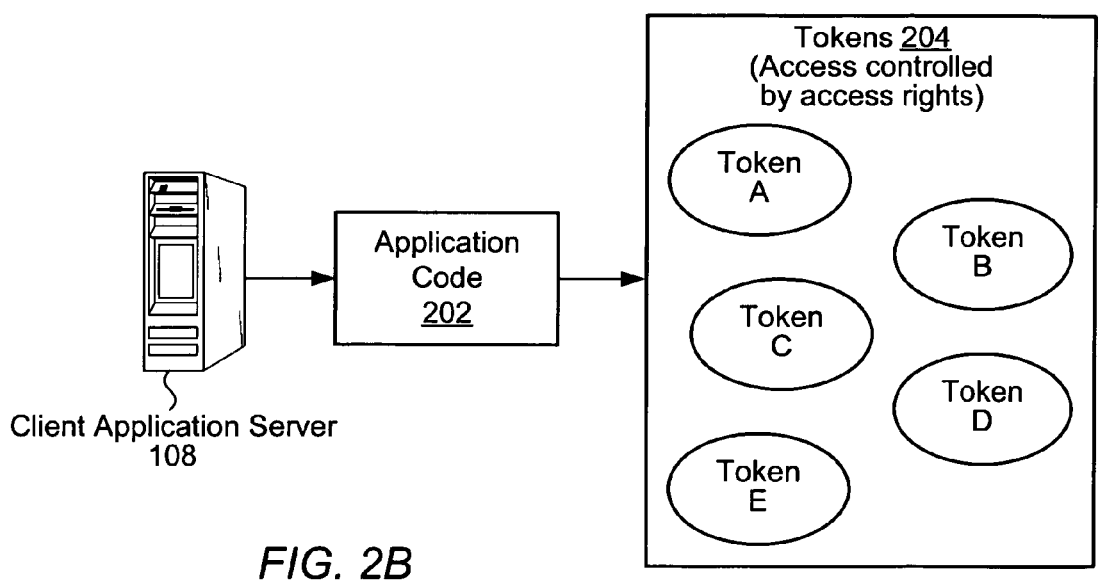

FIGS. 2A and 2B—Shared Tokens

FIG. 2A illustrates a plurality of "tokens" 204 (also referred to herein as "data objects") for which access may be controlled by access rights as described above. As used herein, the term "token" or "data object" may refer to a portion of data stored in memory of a computer system. Each token 204 may comprise data of any kind and may be structured or formatted in any of various ways.

One example of a token 204 is HTTP session data or a portion of HTTP session data. Another example of a token 204 is IIOP session data. Another example of a token 204 is a component or object having callable methods or functions, such as a JavaBean, a Component Object Model (COM) object, a Common Object Request Broker Architecture (CORBA) object, etc.

In a distributed system, the tokens 204 may be stored in memory of any computer of the system. For example, with respect to the distributed system of FIG. 1, the tokens 204 may be stored on one of the application servers 108A or 108B, on the web server 104, in the database 110, or in the backend system 112. The tokens 204 may be stored on the same or on different computers. For example, a first plurality of tokens 204 may be stored on the application server 108A, and a second plurality of tokens 204 may be stored on the application server 108B. Also, the tokens 204 may vary in kind. For example, some tokens 204 may represent HTTP session data for various end users, whereas other tokens 204 may be executable components or objects.

As described above, a thread or process may be required to acquire access rights before accessing a token 204. The thread or process may be required to acquire access rights for each token 204 it needs to access. Thus, if the thread or process needs to access Token A as well as Token B, the thread or process may need to acquire access rights for each respective token. In one embodiment, there may be different types of access rights corresponding to different types of access to the tokens. For example, for read access of a token, the thread or process may need read access rights, whereas for write access of a token, the thread or process may need write access rights, also referred to as a lock.

In various embodiments, the access rights may be used to control access to the tokens using any of various techniques. For example, FIG. 2B illustrates a client thread or process executing on a client application server 108. As shown, the client thread or process may access the tokens 204 through application code 202. In one embodiment, the application code 202 may implement an application code interface enabling the client to access the tokens, wherein the tokens are not otherwise accessible to the client. Thus, the application code 202 may check to ensure that the client holds the appropriate access rights for a token before allowing the client access to the token or before allowing the client a certain kind of access to the token.

In another embodiment, a client may be able to access a token directly, even without holding the appropriate access rights. Such an embodiment may rely on programming convention to avoid conflicts. In other words, even though a programmer may write code operable to access a token without first acquiring the appropriate access rights, the programmer is expected as a matter of practice to write program code that first acquires access rights before accessing a shared token.

Figure 3:
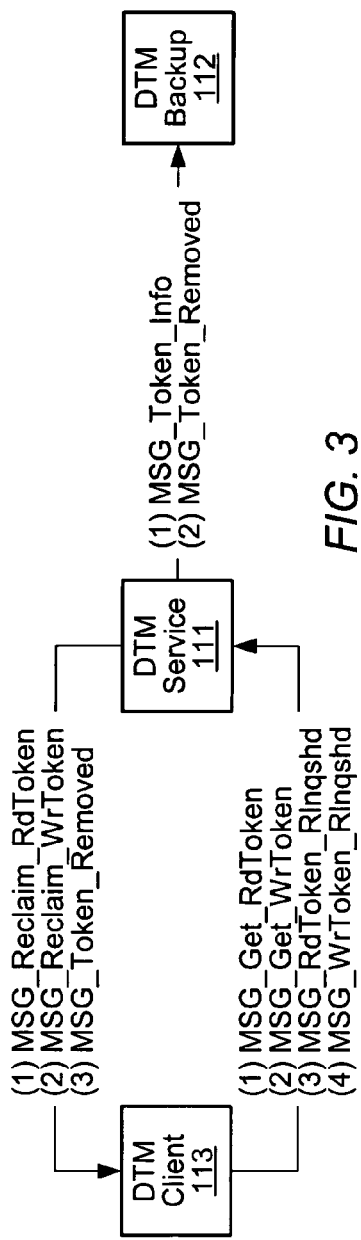
FIG. 3 illustrates messages passed among a Distributed Token Manager (DTM) service, a DTM Client, and a DTM backup service.

FIGS. 3 and 4—Distributed Token Manager

Each client thread or process that needs to acquire access rights for a token may do so by requesting the access rights from a service referred to herein as the Distributed Token Manager (DTM) 111. The DTM service 111 manages the collection of tokens 204. The DTM service may provide an application programming interface (API) through which clients can request to acquire and release access rights. For example, the DTM API may include a Lock() and an Unlock() method for these purposes. In one embodiment, the Lock() and Unlock() methods may have an access type parameter, e.g., either READ, WRITE, and/or READ-WRITE to designate the type of access performed on the token, i.e., the type of access right(s) being acquired or released. In other embodiments, other access types may be supported, such as INTENTIONAL_READ, UPDATE, and INTENTIONAL_WRITE.

The DTM service 111 may also implement AddToken() and RemoveToken() methods to add new tokens to or remove tokens from the managed set of tokens, respectively. Calling the AddToken() method may not actually create the data of the token, but simply instructs the DTM to begin managing access rights for the token. Similarly, calling the RemoveToken() method may not actually delete the token data, but simply instructs the DTM to stop managing access rights for the token. For example, when a new end user begins to use a web application, an AddToken() method may be utilized to associate access rights with an HTTP session data token for the end user. When a new token is added, the DTM may assign the token a unique ID to identify the token. Clients may pass this token ID when requesting to acquire or release access rights for the token.

For any given token, the DTM may operate to ensure that one of the following statements is true at any given time: 1) One or more client processes or threads currently have read access rights to the token and no client processes or threads currently have write access rights to the token; or 2) One client process or thread currently has write access to the token and no other client processes or threads currently have read or write access rights to the token. In one embodiment of the second case, the single client process or thread with write access rights to the token may simultaneously have read access rights to the token. The DTM may maintain state information indicating which clients currently hold which access rights to which tokens to ensure that these conditions are met.

When a client acquires access rights to a token, a timeout may be associated with the access rights. The DTM may ensure that access rights are released when they are timed-out.

A DTM request may be initiated by DTM API methods (e.g., AddToken(), RemoveToken(), Lock(), Unlock(). Such requests may be processed through a sequence of messages as shown in FIG. 3. As shown, messages that may be sent from a DTM Client 113 to the DTM service 111 include:

| | |
|---|---|
| MSG_Get_RdToken | (gets read access rights) |
| MSG_Get_WrToken | (gets write access rights) |
| MSG_RdToken_Rlnqshd | (relinquishes read access rights) |
| MSG_WrToken_Rlnqshd | (relinquishes write access rights) |

Messages that may be sent from the DTM service 111 to a DTM Client 113 include:

| | |
|---|---|
| MSG_Reclaim_RdToken | (reclaims read access rights) |
| MSG_Reclaim_WrToken | (reclaims write access rights) |
| MSG_Token_Removed | (indicates that a token was removed) |

These messages are further described below.

FIG. 3 also illustrates a "DTM Backup" service 112. The DTM backup service 112 is designed to perform backup of state information of the DTM service. When the DTM service 111 itself becomes unavailable (e.g., due to a failure of the computer system in which the DTM service 111 executes), the DTM backup service 112 can become the DTM service 111. Messages that may be sent from the DTM service 111 to the DTM backup service 112 include:

| | |
|---|---|
| MSG_Token_Info | (indicates information regarding a token) |
| MSG_Token_Removed | (indicates that a token was removed) |

In various embodiments, the Distributed Token Manager (DTM) service 111 may execute in various locations with respect to the architecture of the distributed system. For example, where the distributed system includes a cluster of application servers, the DTM service 111 may execute on one of the application servers, such as the application server 108D shown in FIG. 4A. Thus, client processes or threads running on application servers 108A, 108B, and 108C may interface with the DTM service on application server 108D to acquire and release access rights for tokens. Also, client process or threads on application server 108D itself may call the DTM service to acquire and release access rights. As one example, when a client process or thread on application server 108A needs to update an HTTP session data token, e.g., in response to a request directed by the web server 104 of FIG. 1, the client process or thread may call the DTM service on the application server 108D to acquire write access rights for the HTTP session data token.

Figure 4A:
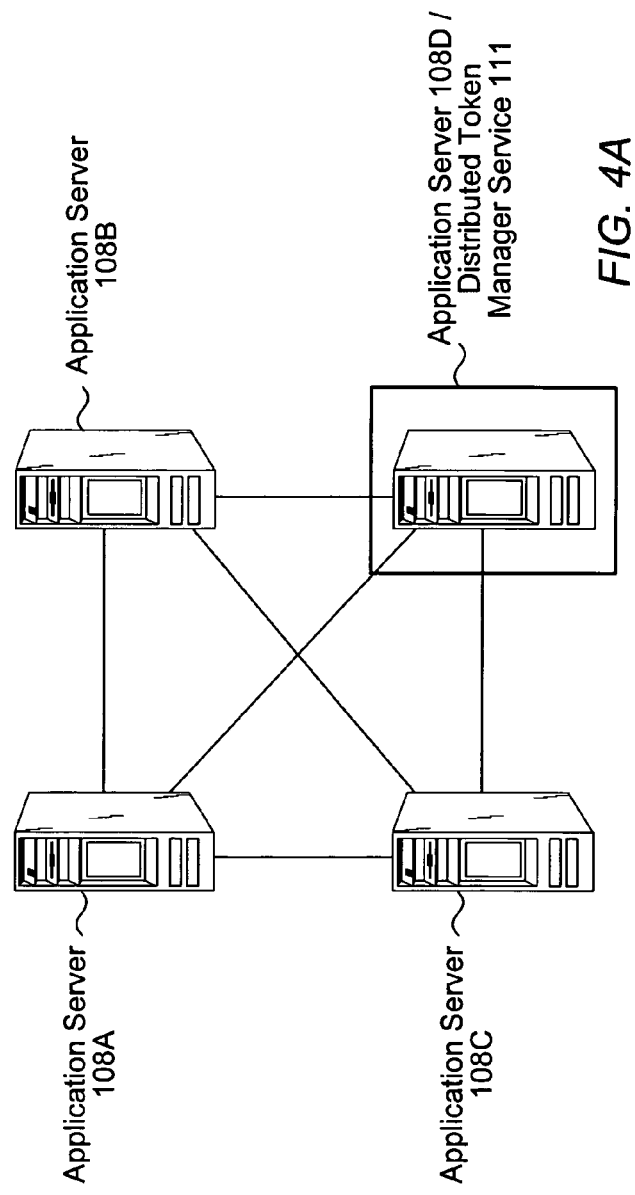
FIG. 4A illustrates an embodiment in which the DTM service executes on an application server from an application server cluster.
Figure 4B:
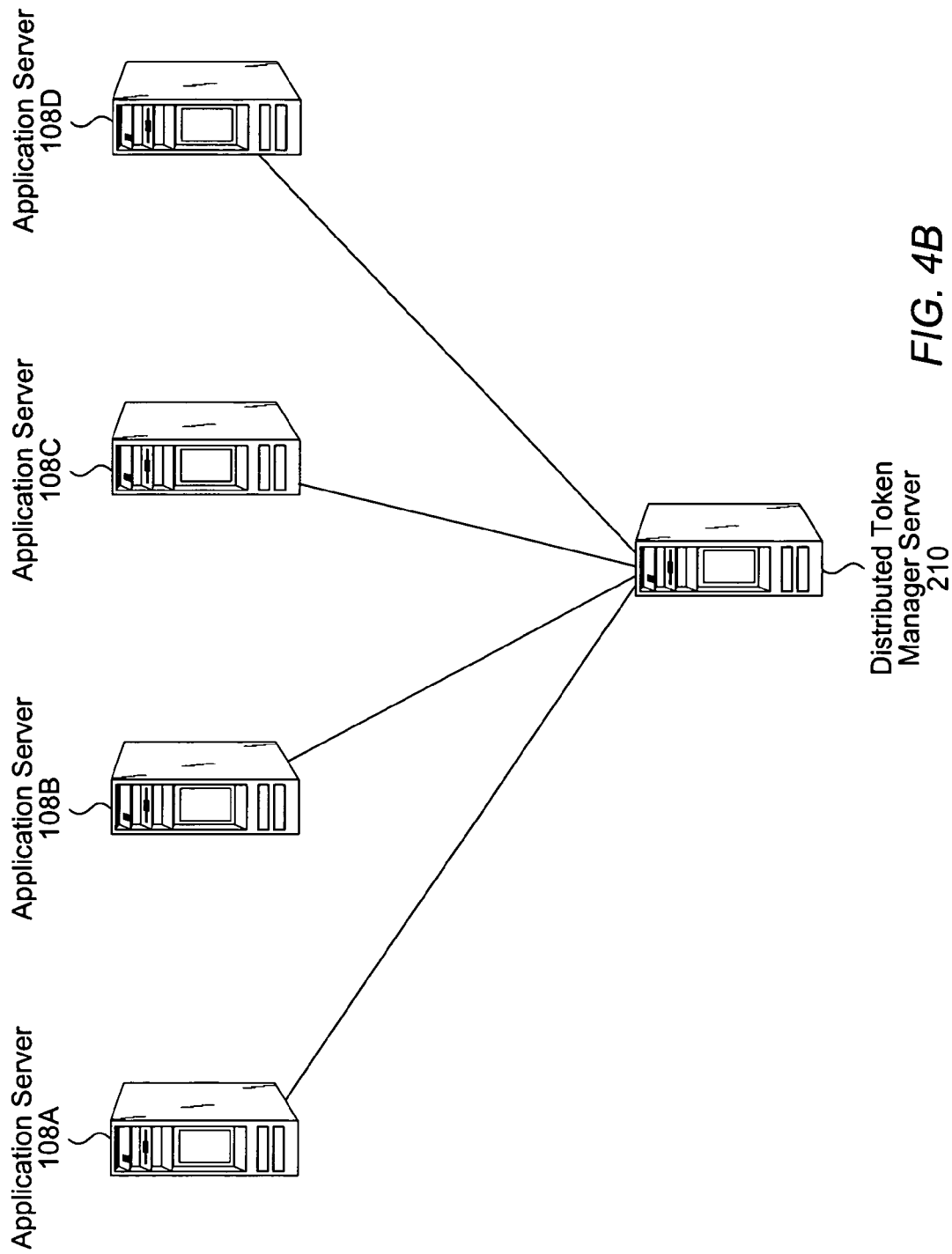
FIG. 4B illustrates an embodiment in which the DTM service executes on a computer system separate from the application server computers.

In another embodiment, the DTM service 111 may execute on a separate DTM server computer 210, such as shown in FIG. 4B. The application servers 108A-108D may interface with the DTM server computer 210 similarly as described above.

The DTM backup service 112 may also execute in various locations with respect to the architecture of the distributed system, such as on one of the application server computers 108 or on a separate computer system. In an embodiment in which there are application server computers located on separate sub-nets, the DTM service 111 may be located in a first sub-net, and the DTM backup service 112 may be located in a second sub-net, to facilitate failover capabilities in case the first sub-net becomes inaccessible.

As discussed above, in one embodiment, the DTM service may be utilized in a distributed system comprising a cluster of application servers that support a web application. In one embodiment, one of the application servers may be designated as a "primary" application server. The primary application server may store data regarding end users, such as HTTP session data. Thus, in addition to being able to process end user requests, the primary application server may act as a centralized location for storing shared data needed by other application servers in the cluster. When an application server other than the primary application server receives an end user request to process, that application server may need to interface with the primary application server to obtain HTTP session data for the end user.

In one embodiment, the DTM service may execute on the primary application server. As described above, the DTM service may coordinate access to HTTP session data. Thus, when an application server needs to acquire read and/or write access rights to HTTP session data for an end user, the application server may first interface with the primary application server to acquire access rights for the HTTP session data, i.e., may send a request to the DTM service on the primary application server. Once the access rights have been acquired, the application server may then access the HTTP session data stored on the primary application server.

One or more of the other application servers in the cluster may be designated as "backup" application servers. The backup application servers may mirror the shared data stored on the primary application server. The backup application servers may be assigned different priorities, and if the primary application server becomes inaccessible, the backup application server with the highest priority may be designated as the new primary application server. In one embodiment, the DTM backup service may execute on the backup application server. If there is more than one backup application server, then a DTM backup service may execute on each of the backup application servers. If a backup application server is promoted to become the primary application server, then the DTM backup service on that application server may be promoted to become the new DTM service.

Also, one or more other application servers in the cluster may be designated as "alternate" application servers. The alternate application servers may also be assigned priorities. If the number of backup application servers in the cluster falls below a threshold value, then the alternate application server having the highest priority may be promoted to the role of a backup application server.

Figure 4C:
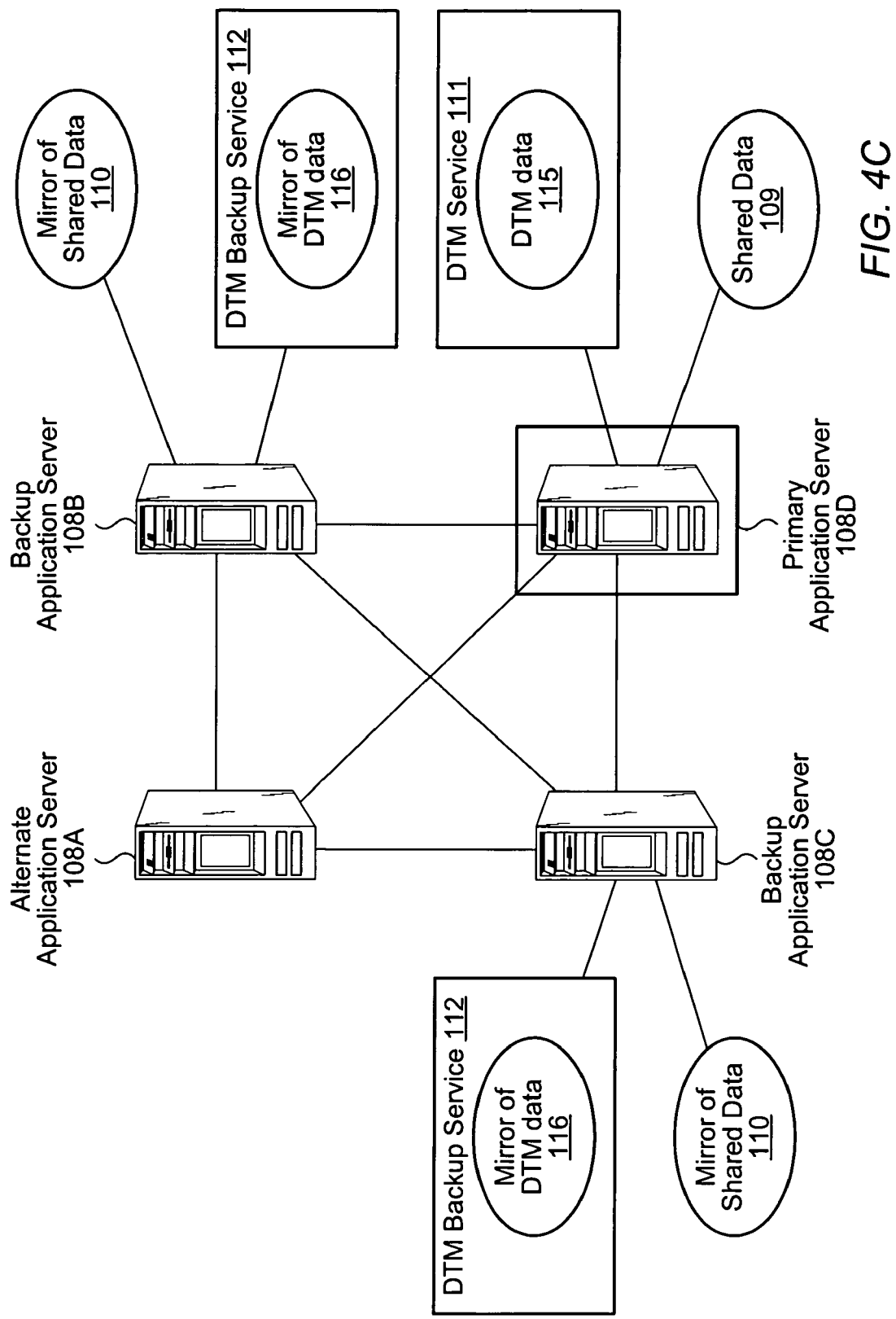
FIG. 4C illustrates an exemplary application server cluster including a primary application server, two backup application servers, and an alternate application server, wherein the DTM service executes on the primary application server, and the backup application servers each execute a DTM backup service.

FIG. 4C illustrates an exemplary application server cluster including a primary application server 108D, two backup application servers 108B and 108C, and an alternate application server 108A. As shown, the backup application servers 108B and 108C maintain mirrors 110 of shared data 109 stored on the primary application server 108D. As discussed above, the shared data 109 may include data such as HTTP session data, IIOP session data, shared components or objects, or other kinds of data.

In the system of FIG. 4C, the DTM service 111 executes on the primary application server 108D, and the backup application servers 108B and 108C each execute a DTM backup service 112. The DTM service 111 maintains DTM data 115 (e.g., state information), and each DTM backup service 112 maintains a mirror 116 of the DTM data 115.

Figure 5:
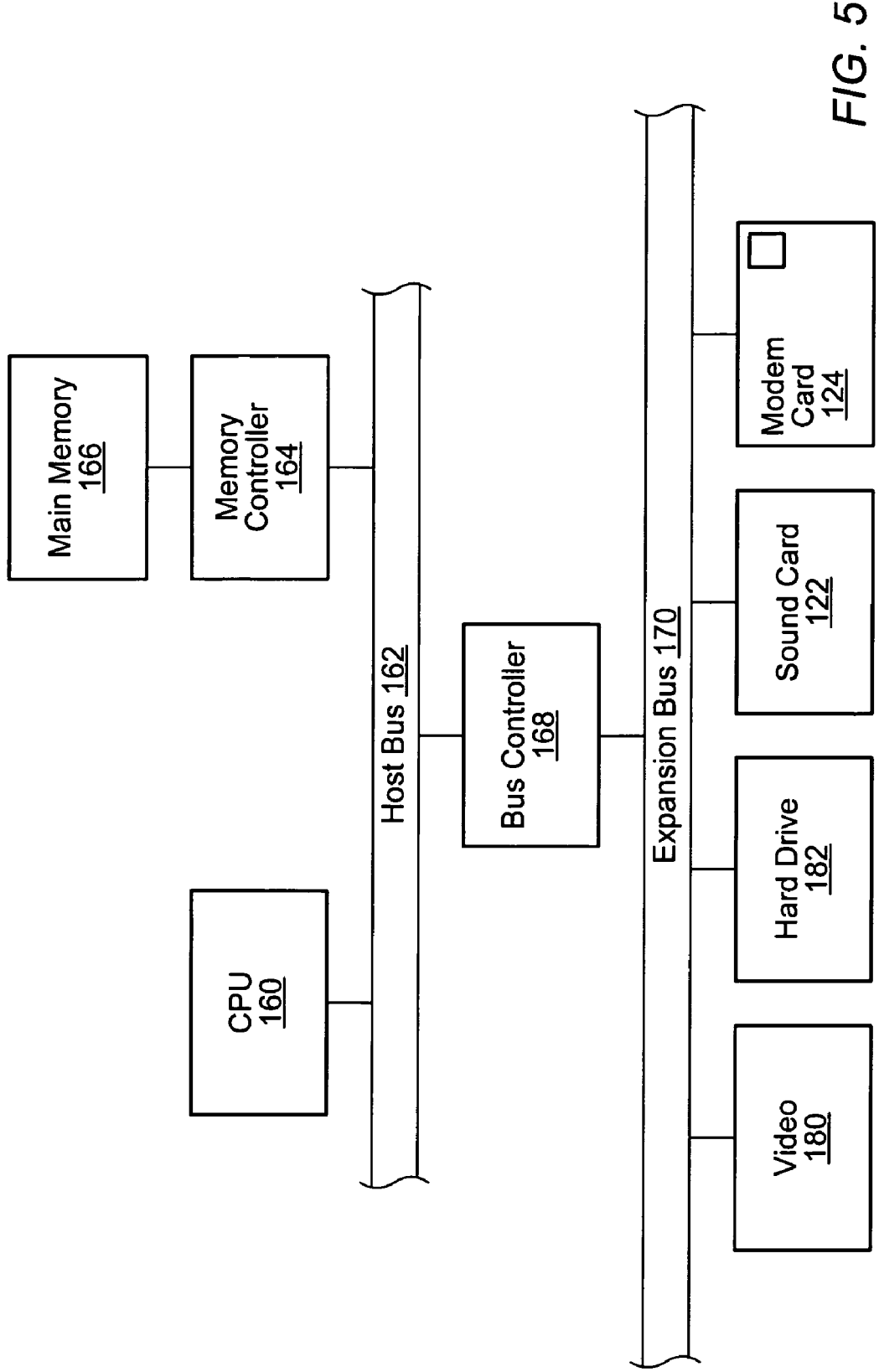
FIG. 5 is a block diagram illustrating one embodiment of a computer system on which the DTM service executes.

FIG. 5—Computer System Block Diagram

FIG. 5 is a block diagram illustrating one embodiment of the computer system on which the DTM service executes, e.g., the application server 108D of FIG. 4A or the computer system 210 of FIG. 4B. Elements of a computer not necessary to understand the present disclosure have been omitted for simplicity. It is noted that any type of computer system configuration or architecture can be used as desired, and FIG. 5 illustrates a representative PC embodiment.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 may be coupled to the host bus 162 by means of memory controller 164.

The host bus 162 may be coupled to an expansion or input/output bus 170 by means of a bus controller 168 or bus bridge logic. The expansion bus 170 may be any type of bus, including the PCI (Peripheral Component Interconnect) expansion bus. The expansion bus 170 may include slots for various devices such as the sound card 122 and the modem card 124. The computer may further include a video display subsystem 180 and hard drive 182 coupled to the expansion bus 170.

The main memory 166 may store operating system software as well as other software for operation of the computer system. The main memory 166 may also store software to implement the DTM service which operates as described herein.

Computer programs operable to perform the methods described herein may also be stored on other types of memory media. The term "memory medium" is intended to include an installation medium, e.g., a CD-ROM, floppy disks, or tape device, a computer system memory or random access memory such as DRAM, SRAM, EDO RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide the program instructions to the first computer for execution.

FIG. 6

Figure 6:
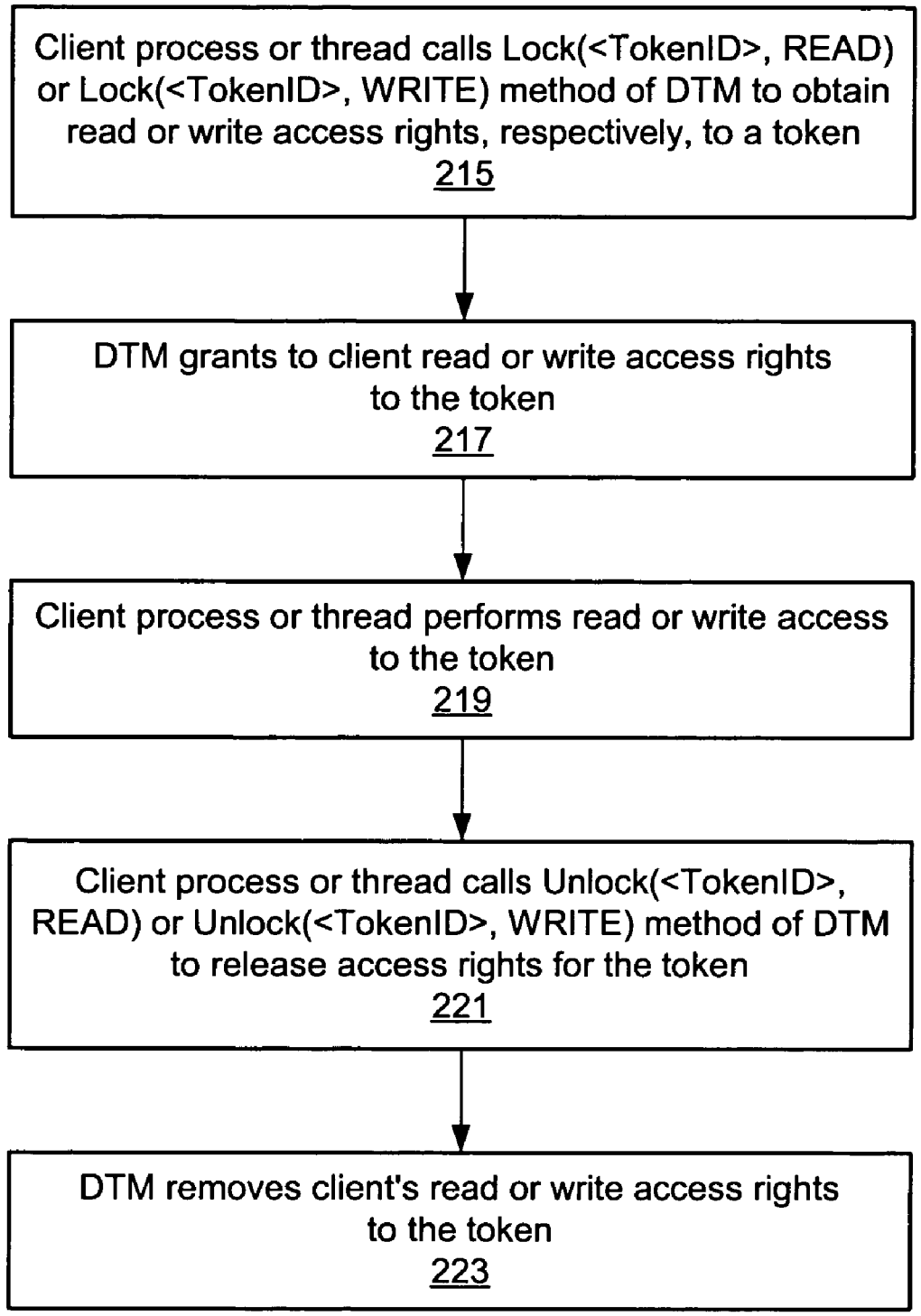
FIG. 6 is a flowchart diagram illustrating one embodiment of a method for accessing and using access rights to access a token.

FIG. 6 is a flowchart diagram illustrating one embodiment of a method for accessing and using access rights to access a token.

In step 215, a client process or thread may call a Lock (<TokenID>, READ) or Lock(<TokenID>, WRITE) method of the DTM service to obtain read or write access rights, respectively, to a token. The <TokenID> parameter may be an identifier for the desired token. As described above, the identifier may have been generated when the AddToken() method of the DTM was called to add the token to the managed set of tokens. The READ/WRITE parameter may identify which type of access right is being requested. The client process or thread may execute in any of various computers of a distributed system, e.g., an application server 108, web server 104, etc.

In step 217, the DTM service may grant read or write access rights to the token in response to the request received in step 215. As described above, the DTM may keep data indicating which clients currently hold which access rights to which tokens. Thus, in step 217, the DTM may update this data to reflect the new grant of access rights. Of course, if another client already holds access rights to the token which prevents the requesting client from acquiring the requested access rights, the access rights may not be granted. In one embodiment, the DTM may notify the requesting client when the other client releases the access rights. The client may then re-request the access rights. In another embodiment, the DTM may automatically grant the access rights to the requesting client when the other client releases the access rights. In another embodiment, the requesting client process or thread may synchronously block until the access rights are granted. In one embodiment, the client may specify the desired behavior in the event that access rights cannot be granted.

In one embodiment of step 217, the DTM may return to the client a data structure indicating that the client has acquired the requested access rights. When the client then attempts to access the token, this data structure may be required. For example, as described above with reference to FIG. 2B, the client may access the token via application code 202. The application code 202 may check to see that the data structure passed by the client is valid before allowing the client to access the token. In another embodiment, the client may not receive any such data structure from the DTM. For example, when a client attempts to access the token, the application code 202 may interface with the DTM to verify that the client holds access rights for the token, or the application code may be operable to itself examine the DTM data to verify that the client holds the necessary access rights.

In step 219, the client process or thread may perform read or write access to the token, e.g., according to which type of access rights were requested in step 215. Performing read access may comprise the client reading the token data. Performing write access may comprise the client writing to or changing the token data. In a case where the token is an executable component or object, in one embodiment, some of the component's methods or functions may require read access for the client to be able to call them, whereas other methods or functions may require write access for the client to be able to call them. For example, a method may require write access if the method changes stateful data of the component and may require read access otherwise. In another embodiment, all methods of a component or object may require read or write access only.

In step 221, the client may call an Unlock(<TokenID>, READ) or Unlock(<TokenID>, WRITE) method of the DTM service to release access rights for the token.

In step 223, the DTM service may remove the client's read or write access rights to the token. Similarly as described above for step 217, this may comprise the DTM updating data to indicate that the client no longer holds the access rights.

Figure 7:
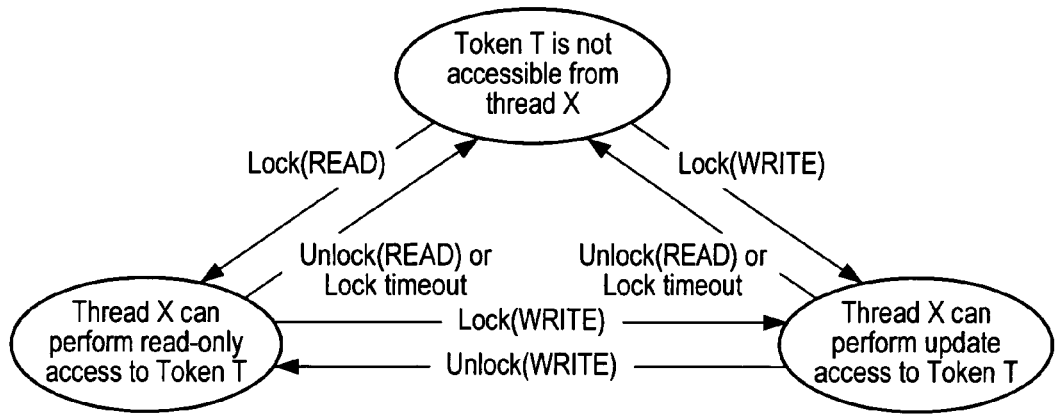
FIG. 7 illustrates a state diagram showing operations a client may perform on a token when holding various types of access for the token.

In one embodiment, when if the client acquired write access to the token in steps 215, then when the client releases the write access in step 221, the client may still hold read access to the token by default. Thus the client may require write access rights to a token and may perform write and/or read access to the token. The client may then release the write access rights and still perform read access to the token. Other clients may also acquire read access to the token at this point. The client may then release the read access rights when they are no longer required. FIG. 7 illustrates a state diagram showing this relationship.

FIG. 7 also illustrates the concept of "lock timeout". According to this concept, when a client process or thread acquires access rights to a token, the access rights can be automatically reclaimed by the DTM after the timeout period expires. This can be useful when a thread dies or suspends without releasing the access rights. The timeout value may be relative to the last invocation of a Lock() or Unlock() method. In one embodiment, the DTM may only reclaim access rights if other clients have actually requested access rights for the token.

Figure 8:
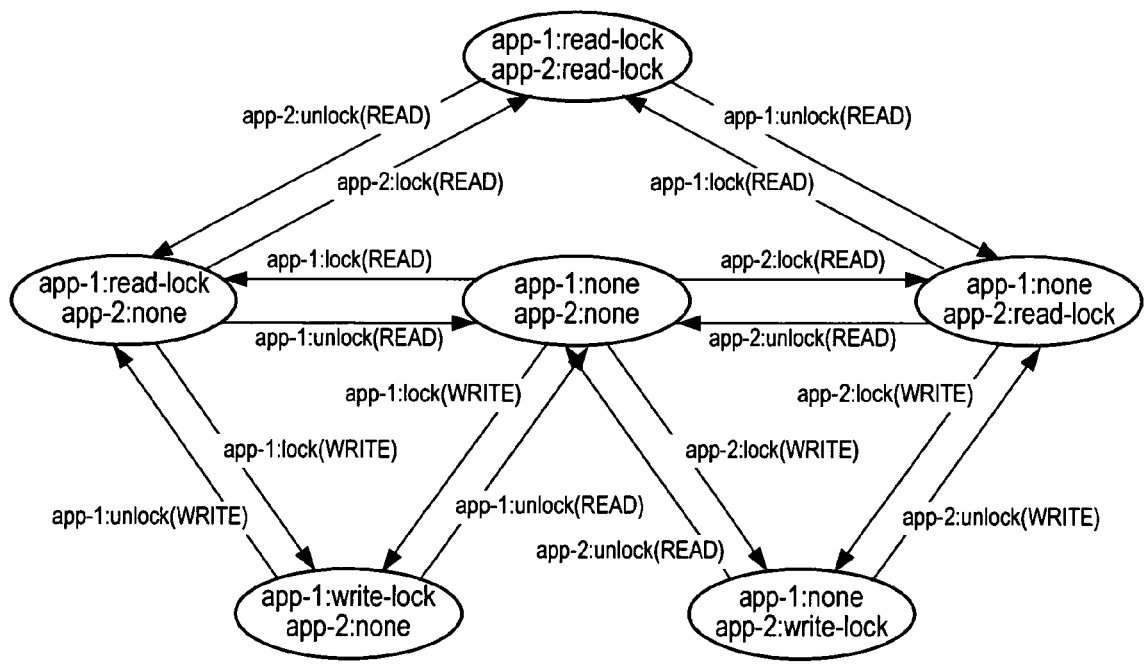
FIG. 8 illustrates a state diagram illustrating the interaction for access right acquisition and release requests issued by two client processes.

FIG. 8 illustrates a more detailed state diagram illustrating the interaction for access right acquisition and release requests issued by two client processes, app-1 and app-2. As one state example, consider the state labeled "app-1:readlock and app-2:none", indicating that app-1 currently holds read access rights for the token and app-2 currently holds no access rights. From this state, the following actions are possible: 1) app-2 may acquire read access rights for the token; 2) app-1 may release read access rights for the token; or 3) app-1 may acquire write access rights for the token. However, app-2 may not, for example, acquire write access rights for the token from this state. App-2 may only acquire write access rights from a state in which app-1 has no access rights, i.e., the states labeled as "app-1:none".

Figure 9:
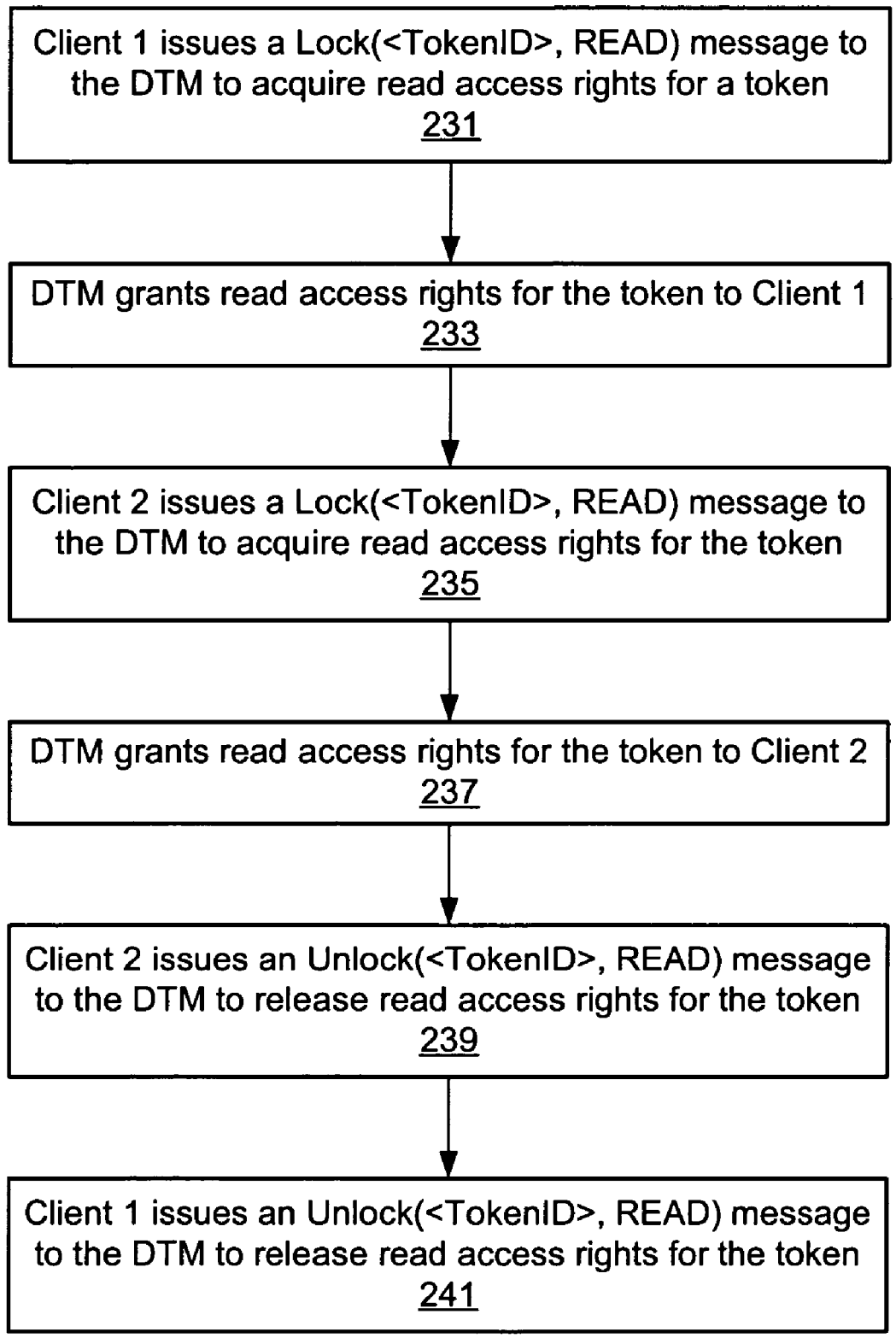
FIG. 9 is a flowchart diagram illustrating one embodiment of a method in which two clients simultaneously perform read access of a token.

FIG. 9—Two Clients Simultaneously Hold Read Access

FIG. 9 is a flowchart diagram illustrating one embodiment of a method in which two clients simultaneously perform read access of a token.

In step 231, Client 1, i.e., a first client process or thread, issues a Lock(<TokenID>, READ) message to the DTM to acquire read access rights for a token.

In step 233, the DTM grants read access rights for the token to Client 1.

In step 235, Client 2 issues a Lock(<TokenID>, READ) message to the DTM to acquire read access rights for the token.

In step 237, the DTM grants read access rights for the token to Client 2.

In step 239, Client 2 issues an Unlock(<TokenID>, READ) message to the DTM to release read access rights for the token, e.g., after performing read access of the token.

In step 241, Client 1 issues an Unlock(<TokenID>, READ) message to the DTM to release read access rights for the token, e.g., after performing read access of the token.

Lazily Reclaimed Access Rights

In one embodiment, each Lock() method call may be implemented as a synchronous message communication between a client and the DTM service, and each Unlock() method call may be implemented as an asynchronous message communication from a client and the DTM service. Thus, when a client calls the Unlock() method to release access rights, the client may immediately interface with the DTM service, and the DTM service may update its data to indicate that the client no longer holds the access rights for the token. This may be referred to as the "active" model.

For certain services and applications, especially those that perform mostly read access and seldom perform write access, such communication overhead may not be necessary. Thus, in another embodiment, a "lazy model" may be utilized, wherein the DTM service may perform "lazily reclamation" of access rights. For lazily reclaimed access rights, the client may not actively interface with the DTM service when Lock() and Unlock() methods are called. Instead, the DTM service reclaims the access rights when necessary, e.g., when another client needs the access rights. This may increase the efficiency of the application.

According to the lazy model, when the client invokes the Unlock() method, the client may not interface with the DTM service to release the access rights in response. Instead, for example, the Unlock() method may operate locally on the client computer to indicate the client has released the access rights. Thus, when the client performs another Lock() method to again acquire access rights, the Lock() method does not need to communicate with the DTM service. Instead, for example, the Lock() method may operate locally on the client computer to indicate the client has acquired the access rights. When the DTM service receives a request for access rights to the token from another client, the DTM service may then reclaim the access rights, e.g., by issuing a MSG_Reclaim_RdToken or MSG_Reclaim_WrToken message to the client.

Thus, communication overhead between the client and the DTM service may be substantially reduced. Server-client communication may only happen when the client issues a Lock() request and the access rights are not available locally, or when the DTM server reclaims the token from the client.

Figure 10:
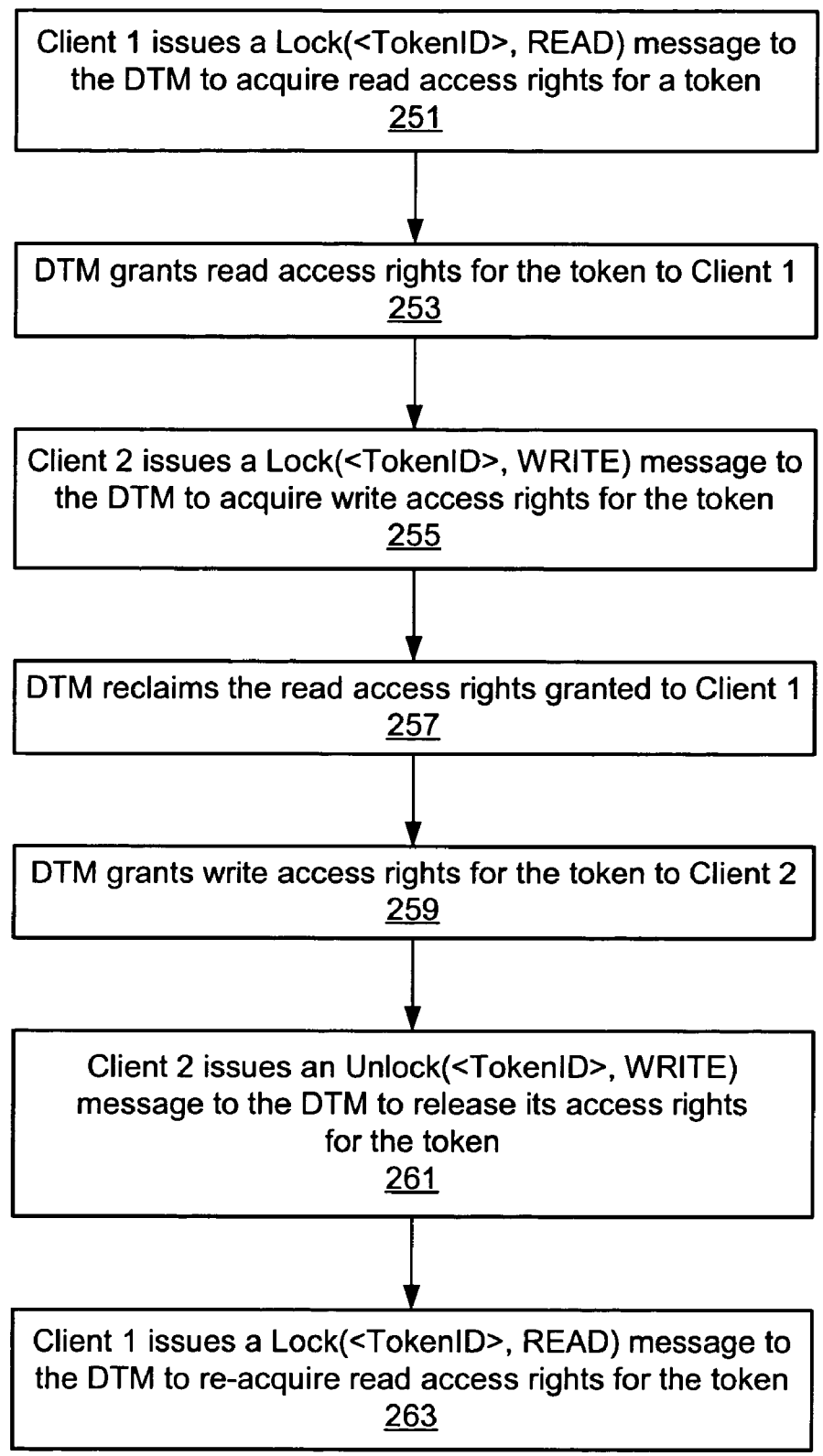
FIG. 10 is a flowchart diagram illustrating one embodiment of a method in which access rights for a token are lazily reclaimed.

FIG. 10—Lazily Reclaimed Access Rights

FIG. 10 is a flowchart diagram illustrating one embodiment of a method in which access rights for a token are lazily reclaimed. It is assumed that no client currently holds access rights for the token before the first step of the flowchart.

In step 251, Client 1 issues a Lock(<TokenID>, READ) message to the DTM service to acquire read access rights for a token.

In step 253, the DTM service grants read access rights for the token to Client 1 in response to the request.

In step 255, Client 2 issues a Lock(<TokenID>, WRITE) message to the DTM service to acquire write access rights for the token.

In step 257, the DTM service may reclaim the read access rights granted to Client 1. In one embodiment, Client 1 may still hold the access rights until Client 1 calls the Unlock() method. At that point, Client 1 may interface with the DTM service to release the access rights. In another embodiment, Client 1 may have to immediately relinquish the access rights when the DTM service reclaims the access rights. However, in this embodiment, the access rights may only be immediately relinquished if Client 1 has held the access rights for a threshold amount of time, e.g., to ensure that the access rights are not reclaimed immediately before Client 1 has time to access the token.

In step 259, the DTM service grants write access rights for the token to Client 2.

In step 261, Client 2 issues an Unlock(<TokenID>, WRITE) message to the DTM service to release its access rights for the token. As described above, in one embodiment, Client 2 may also issue an Unlock(<TokenID>, READ) message to the DTM to fully release the access rights.

In step 263, Client 1 issues a Lock(<TokenID>, READ) message to the DTM service to re-acquire read access rights for the token. In another embodiment, step 263 may not be necessary, and the DTM service may automatically re-grant access rights to a client from whom the access rights have been reclaimed.

DTM Server Implementation Details

This section provides miscellaneous implementation details for one embodiment of the DTM service.

The DTM service may maintain the following state information for each token:
client processes or threads that have access rights for the token (owner list)
a request queue containing received requests for the token
status information indicating whether the token is to be reclaimed actively or lazily The DTM service may be operable to handle received MSG_Get_RdToken, MSG_Get_WrToken, MSG_RdToken_Rlnqshd, and MSG_WrToken_Rlnqshd messages.

The DTM service may be operable to handle failure of clients and the DTM backup. When a DTM client becomes unavailable, the client may be removed from the owner lists for the tokens. When the DTM backup service becomes unavailable, the DTM service may instantiate new DTM backup services and backup its state information to the new DTM backups.

The DTM service may detect and remove deadlocks. A deadlock detection algorithm may detect token deadlocks, and a deadlock resolution mechanism may resolve the deadlock situations.

Handling MSG Get RdToken Messages

For a received MSG_Get_RdToken message, the DTM service may perform the following operations:
If write access rights have been issued for the token:
If the write access rights were issued in "lazy reclaim" mode, the DTM server may send a MSG_Reclaim_WrToken message to the client and wait for the client to send back a MSG_WrToken_Rlnqshd message.
If the write access rights were not issued in "lazy reclaim" mode, the DTM server may wait for the client to finish its work.

The DTM service may then issue access read access rights for the token. The read access rights may be issued in "lazy reclaim" mode. However, if any other queued requests are requesting write access rights for the token, the read access rights may not be issued in "lazy reclaim" mode.

The DTM service may also send a MSG_Token_Info message to the DTM backup service.

Handling MSG Get WrToken Messages

For a received MSG_Get_WrToken message, the DTM service may perform the following operations:
If write access rights have been issued for the token:
If the write access rights were issued in "lazy reclaim" mode, the DTM service may send a MSG_Reclaim_WrToken message to the client and wait for the client to send back a MSG_WrToken_Rlnqshd message.
If the write access rights were not issued in "lazy reclaim" mode, the DTM service may wait for the client to finish its work.
If read access rights have been issued for the token:
If the read access rights were issued in "lazy reclaim" mode, the DTM service may send a MSG_Reclaim_RdToken message to the client and wait for the client to send back a MSG_RdToken_Rlnqshd message.
If the read access rights were not issued in "lazy reclaim" mode, the DTM service may wait for the client to finish its work.

The DTM service may then issue access write access rights for the token. The write access rights may be issued in "lazy reclaim" mode. However, if any other queued requests are requesting read or write access rights for the token, the write access rights may not be issued in "lazy reclaim" mode.

The DTM service may also send a MSG_Token_Info message to the DTM backup service.

DTM Backup Service Implementation Details

This section provides miscellaneous implementation details for one embodiment of the DTM backup service.

The DTM backup service may be operable to handle MSG_Token_Info and MSG_Token_Removed messages received from the DTM service. The messages may be unpacked or unmarshalled and the DTM backup service state information may be updated accordingly. The DTM backup service may maintain identical state information as the DTM service.

The DTM backup service may also provide a callback method for handling the failure of the DTM service. When the DTM service becomes unavailable, this callback may be invoked. All access rights previously issued by the DTM service may be reclaimed.

Client Implementation Details

This section provides miscellaneous implementation details for one embodiment of a client computer that interfaces with the DTM service.

On each client computer, the following methods may be implemented: Lock(), Unlock(), AddToken(), RemoveToken(), IsLockedForWrite(), IsLockedForRead().

Each client may maintain information regarding access rights for tokens accessed by the client, such as:
- information specifying whether the client currently holds read and/or write access rights
- A queue of unlock/lock requests to be sent to DTM
- For each token, whether the access rights should be reclaimed lazily or actively
- For each token, whether the access rights are ready for reclaim Each client may be operable to handle MSG_Reclaim_RdToken and MSG_Reclaim_WrToken messages received from the DTM service.

Multiple DTM Services

In one embodiment, there may be multiple DTM services. For example, each DTM service may execute on a different application server 108. Each token may be managed by only one DTM service. In one embodiment, an algorithm may be employed to determine how tokens are allocated among the DTM services. For example, the algorithm may be designed to reduce network traffic by assigning tokens the DTM service most near to the client computers that need to access the tokens. The algorithm may also be designed to be scalable, e.g., so that a balanced workload occurs across different application servers.

Distributed Token Manager with Transactional Properties

Figure 11:
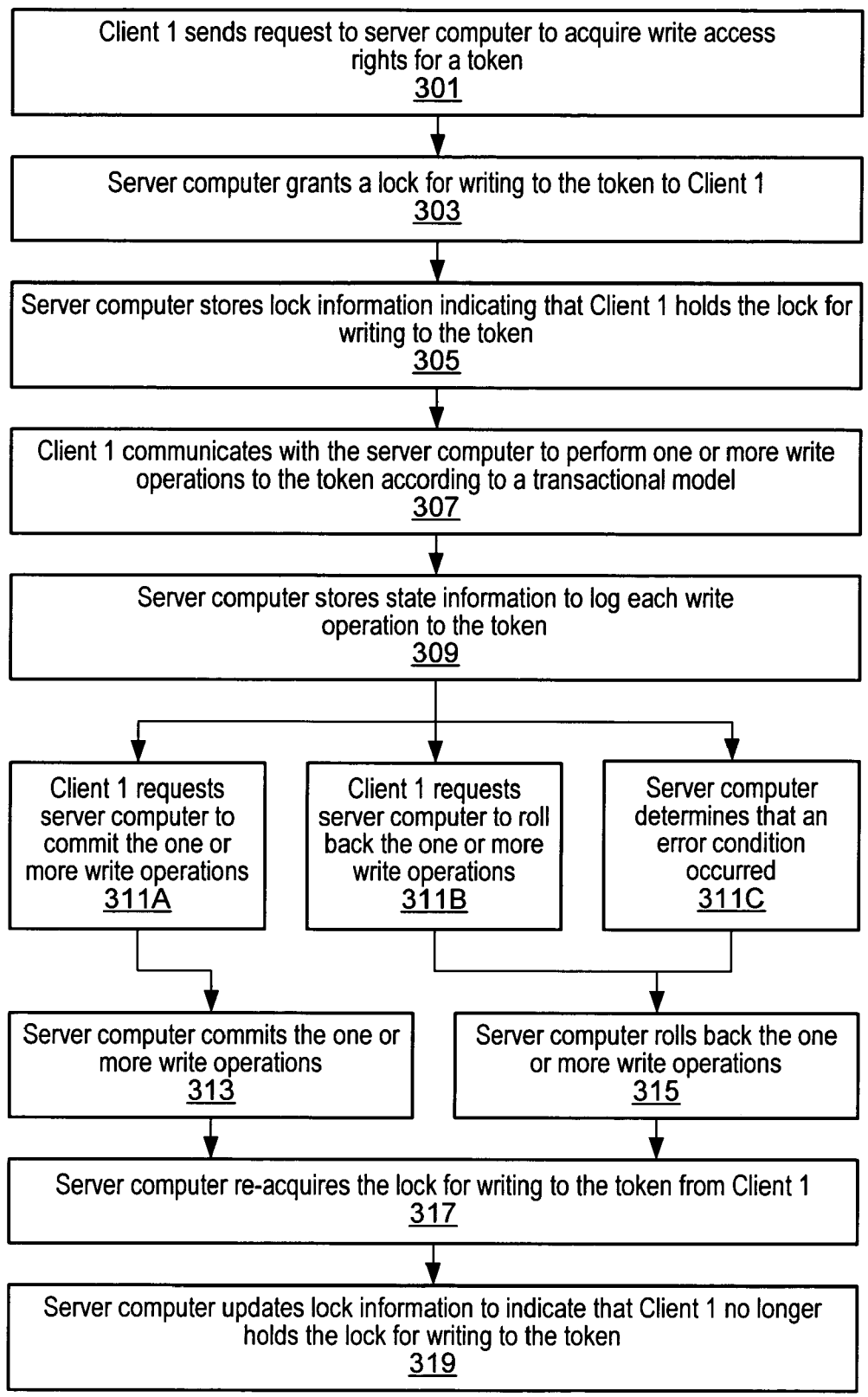
FIG. 11 is a flowchart diagram illustrating one embodiment of a method for performing write operations to a token according to a transactional model.

In one embodiment, the DTM may utilize a transactional model. The DTM may be operable to commit or roll back write operations performed by the client. FIG. 11 is a flowchart diagram illustrating one embodiment of a method for performing write operations to a token according to a transactional model.

In 301, Client 1 (i.e., a first client process or thread) may send a request to a server computer to acquire write access rights for a token or data object. For example, the server computer may implement the DTM as described above.

In 303, the server computer may grant a lock or write access rights for writing to the token to Client 1, similarly as described above.

In 305, the server computer may store lock information indicating that Client 1 holds the lock for writing to the token. For example, the server computer may maintain a table of locks for every token involved in a transaction. This table may include information such as transaction ID, lock owner, transaction participants, transaction owner, transaction-log-ID, etc.

In 307, Client 1 may communicate with the server computer to perform one or more write operations to the token according to a transactional model. In other words, the one or more write operations to the token may be performed such that the one or more write operations can later be either committed or rolled back. In one embodiment the server computer may have exclusive write access to the token so that Client 1 is required to request the write operation to be performed via the server computer.

As shown in 309, the server computer may store state information to log each write operation to the token. In one embodiment, the entire token or data object may be stored or logged. In another embodiment, only a portion of the token or data object may be stored or logged. For example, if a write operation affects a portion of the token or data object, such as a variable or property, then the affected portion may be logged. As described below, the logged state information may be used to roll back the state of the data object if necessary.

Several possible situations may cause the write operations performed by Client 1 to be either committed or rolled back. In one embodiment, Client 1 may request the server computer to commit the one or more write operations, as shown in 311A. In response, the server computer may commit the one or more write operations, as shown in 313. A request to commit the one or more write operations indicates normal operation in which no errors or other conditions have occurred which necessitate the changes to the data object caused by the write operations to be un-done. Thus, committing the one or more write operations may comprise making the changes permanent. The term "permanent" is used in this instance only in the sense that the commit operation indicates that no rollback operation will be performed. The data object can of course be modified later in another transaction by the same client or a different client.

In another embodiment, Client 1 may request the server computer to roll back the one or more write operations, as shown in 311B. In response, the server computer may roll back the one or more write operations, as shown in 315. Rolling back the one or more write operations has the effect of un-doing whatever changes the one or more write operations caused to the token or data object. The state information stored by the server computer in 309 may be used to restore the state of the data object before the transaction was begun, i.e., before the write operations were performed.

As shown in 311C, the server computer may also initiate a rollback operation in response to determining that an error condition occurred. For example, as described above, a timeout may be associated with the lock granted to Client 1. If the server computer detects a timeout error then the server computer may initiate a rollback operation. The server computer may also initiate the rollback operation in response to discovering a network failure or other error which occurred on Client 1. In one embodiment, an application error detected by application logic may also cause a rollback operation to be performed. For example, the application may be configured to initiate a rollback if Client 1 attempts to also acquire access to a second token or data object without first releasing access rights to the current token.

As shown in 317, the server computer may re-acquire the lock for writing to the token from Client 1. A request to commit or rollback the one or more write operations indicates that Client 1 no longer needs the lock, and a rollback initiated by the server computer indicates that Client 1 no longer has authority to write to the data object. The server computer may update the lock information to indicate that Client 1 no longer holds the lock for writing to the token, as shown in 319.

In various embodiments, the transactional properties described above may be implemented in any of various ways. In one embodiment the server computer may act as an XA resource manager utilizing XA threads to achieve portions of the transactional behavior.

In one embodiment, a client may initiate a transaction before requesting write access to a token. The following portion of code illustrates a transactional model for accessing tokens, according to one embodiment. It is noted that although this code is written in the Java programming language, in various embodiments APIs for use by client applications may be provided for any programming language or platform.

```
UserTransaction ut = context.getUserTransaction( ); // Get the transaction
// associated with this module
Connection conn; // SQL or JDBC connection
Statement stmt; // SQL statement
SomeMethod( )
{
try {
ut.begin( ); // begin the transaction
// All database and DLM related activity, e.g. acquiring db connections,
// statements and executing SQL statements, and invoking DLM APIs are
// in the scope of transaction 'ut' and are bound to it.
conn = dataSource.getConnection( );
stmt = conn.createStatement( );
stmt.executeUpdate(...);
stmt.close( );
data = DLM.Lock(data_id, WRITE); // throws exception if not successful
data.setAttribute("UID", "SUN_MICRO");
DLM.ReleaseLock(data_id);
// some more SQL stuff here
stmt = conn.createStatement( );
stmt.executeUpdate(...);
ut.commit( );
} catch(Exception e) {
ut.rollback( ); // will in turn call roll-back on all the RMs including the
DLM Manager.
} finally {
stmt.close( );
conn.close( );
}
}
```

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for coordinating access to a data object utilized in a distributed software application, the method comprising:
    a server computer granting a lock for writing to the data object to a first client computer;
    the first client computer performing one or more write operations to the data object according to a transactional model, wherein said performing the one or more write operations to the data object according to the transactional model enables the one or more write operations to be either committed or rolled back;
    the server computer re-acquiring the lock for writing to the data object from the first client computer; and
    the server computer performing one of:
        committing the one or more write operations performed by the first client computer; or
        rolling back the one or more write operations performed by the first client computer in response to a failure;
    the server computer communicating state information for the data object to a backup server computer to maintain a backup of the state information on the backup server computer, wherein the state information comprises information regarding the lock for writing.

2. The method of claim 1,
    wherein said first client computer performing one or more write operations to the data object results in one or more changes to the data object;
    wherein said committing the one or more write operations performed by the first client computer comprises making the one or more changes to the data object permanent.

3. The method of claim 1,
    wherein said first client computer performing one or more write operations to the data object results in one or more changes to the data object;
    wherein said rolling back the one or more write operations performed by the first client computer comprises undoing the one or more changes to the data object.

4. The method of claim 1, further comprising:
    the server computer receiving a request from the first client computer to commit the one or more write operations;
    wherein said sewer computer committing the one or more write operations is performed in response to the request.

5. The method of claim 4, wherein said server computer re-acquiring the lock for writing to the data object from the first client computer is performed in response to the request to commit the one or more write operations.

6. The method of claim 1, further comprising:
    the server computer receiving a request from the first client computer to roll back the one or more write operations;
    wherein said server computer rolling back the one or more write operations is performed in response to the request.

7. The method of claim 6, wherein said server computer re-acquiring the lock for writing to the data object from the first client computer is performed in response to the request to roll back the one or more write operations.

8. The method of claim 1, further comprising:
    the server computer determining that an error condition occurred;
    wherein said server computer rolling back the one or more write operations is performed in response to the error condition.

9. The method of claim 8, wherein said server computer re-acquiring the lock for writing to the data object from the first client computer is performed in response to said server computer determining the error condition.

10. The method of claim 8, wherein said server computer determining that an error condition occurred comprises the server computer determining that a timeout occurred.

11. The method of claim 8, wherein said server computer determining that an error condition occurred comprises the server computer determining that a failure of the first client computer occurred.

12. The method of claim 1, further comprising:
    the server computer storing the state information for the data object;
    wherein said server computer rolling back the one or more write operations performed by the first client computer comprises the server computer using the state information to restore a previous state of the data object.

13. The method of claim 1, wherein said first client computer performing one or more write operations to the data object comprises the first client computer communicating with the server computer to perform the one or more write operations to the data object.

14. The method of claim 13, wherein the server computer has exclusive write access to the data object.

15. The method of claim 13,
wherein the server computer logs information regarding the one or more write operations to the data object;
wherein the information regarding the one or more write operations to the data object is usable to roll back the one or more write operations.

16. The method of claim 1, further comprising:
the server computer receiving a request from the first client computer to acquire the lock for writing to the data object;
wherein said sewer computer granting the lock to the first client computer comprises the sewer computer granting the lock to the first client computer in response to the request.

17. The method of claim 1, further comprising:
the server computer receiving a request from a second client computer for a lock for writing to the data object; and
the server computer queuing the request from the second client computer until after said server computer re-acquiring the lock for writing to the data object from the first client computer.

18. The method of claim 1,
wherein said server computer granting the lock for writing to the data object to the first client computer includes storing information indicating that the first client computer holds the lock for writing to the data object;
wherein said server computer re-acquiring the lock for writing to the data object from the first client computer includes updating the information to indicate that the first client computer no longer holds the lock for writing to the data object.

19. The system of claim 1, wherein the data object comprises one of:
HTTP session data;
IIOP session data;
a component having callable methods.

20. The method of claim 1, wherein the data object is located on the first client computer.

21. The method of claim 1, wherein the data object is located on the server computer.

22. The method of claim 1, wherein the data object is located on a computer coupled to the first client computer.

23. A method for coordinating access to a data object utilized in a distributed software application, the method comprising:
granting a lock for writing to the data object to a first client computer;
storing lock information indicating that the first client computer holds the lock for writing to the data object;
determining that a failure occurred on the first client computer;
updating the lock information to indicate that the first client computer no longer holds the lock for writing to the data object in response to said determining that the failure occurred on the first client computer; and
queuing a request by a second client computer to acquire the lock for writing to the data object after said granting the lock for writing to the data object to the first client computer;
wherein the first client computer performs one or more write operations on the data object;
wherein the method further comprises rolling back the one or more write operations in response to determining that the failure occurred on the first client computer.

24. The method of claim 23, further comprising:
granting the lock for writing to the data object to the second client computer after said updating the lock information to indicate that the first client computer no longer holds the lock for writing to the data object; and
storing lock information indicating that the second client computer holds the lock for writing to the data object.

25. A server computer operable to process requests sent by a plurality of client computers, the server computer comprising:
a first memory storing program instructions;
a first processor coupled to the first memory;
wherein the first processor is operable to execute program instructions stored in the first memory to implement a manager service;
wherein the manager service is operable to:
grant a lock for writing to a data object to a first client computer, wherein the data object is located on the first client computer;
perform one or more write operations to the data object in response to one or more requests from the first client computer, wherein the one or more write operations to the data object are performed according to a transactional model, wherein said performing the one or more write operations to the data object according to the transactional model enables the one or more write operations to be either committed or rolled back;
re-acquire the lock for writing to the data object from the first client computer; and
perform one of:
commit the one or more write operations to the data object; or
roll back the one or more write operations to the data object in response to a failure.

26. The server computer of claim 25,
wherein said performing the one or more write operations to the data object results in one or more changes to the data object;
wherein said committing the one or more write operations comprises making the one or more changes to the data object permanent.

27. The server computer of claim 25,
wherein said performing the one or more write operations to the data object results in one or more changes to the data object;
wherein said rolling back the one or more write operations comprises undoing the one or more changes to the data object.

28. A method for coordinating access to HTTP session data utilized in a distributed software application, the method comprising:
a server computer granting a lock for writing to the HTTP session data to a first client computer;
the first client computer performing one or more write operations to the HTTP session data according to a transactional model, wherein said performing the one or more write operations to the HTTP session data according to the transactional model enables the one or more write operations to be either committed or rolled back;

the server computer re-acquiring the lock for writing to the HTTP session data from the first client computer; and the server computer performing one of:
committing the one or more write operations performed by the first client computer; or
rolling back the one or more write operations performed by the first client computer in response to a failure.

29. A distributed system operable to coordinate access to shared data, the system comprising:
a plurality of client computers;
wherein the client computers execute client processes operable to send requests to a manager service to acquire access rights for accessing data objects stored on a first computer;
wherein the manager service is operable to respond to the requests sent by the client processes to grant access rights for the data objects;
wherein the manager service is operable to support a transactional model for writing to the data objects such that for each client process that acquires access rights for writing to a data object, the manager service is operable to either commit or roll back write operations which the client process performs on the data object;
wherein the manager service is further operable to send a reclaim request to a client process to re-acquire access rights granted to the client; and
wherein the manager service is further operable to perform one of:

committing the one or more write operations performed by the first client computer; or rolling back the one or more write operations performed by the first client computer in response to a failure.

* * * * *

UNITED STATES PATENT AND TRADEMARK OFFICE
CERTIFICATE OF CORRECTION

| | | |
|---|---|---|
| PATENT NO. | : 7,281,050 B2 | Page 1 of 1 |
| APPLICATION NO. | : 10/408885 | |
| DATED | : October 9, 2007 | |
| INVENTOR(S) | : Darpan Dinker et al. | |

It is certified that error appears in the above-identified patent and that said Letters Patent is hereby corrected as shown below:

In the Claims:

Claim 4, col. 18, line 23, please delete "sewer" and insert --server-- in place thereof.

Claim 16, col. 19, line 16, please delete "sewer" and insert --server-- in place thereof.

Claim 30, col. 22, line 9, between "client" and "; and", please insert --process--.

Signed and Sealed this

Eleventh Day of December, 2007

JON W. DUDAS
*Director of the United States Patent and Trademark Office*